Aug. 12, 1924.
S. F. CROY
1,504,815
TRAFFIC SIGNAL FOR MOTOR VEHICLES
Filed Dec. 14, 1921
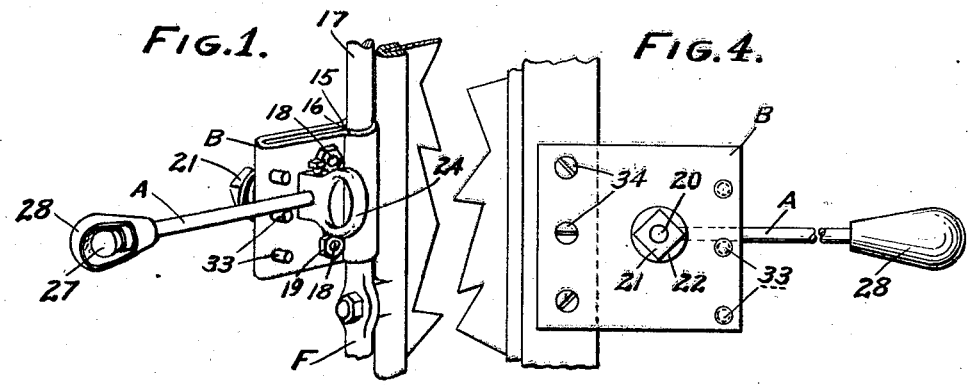
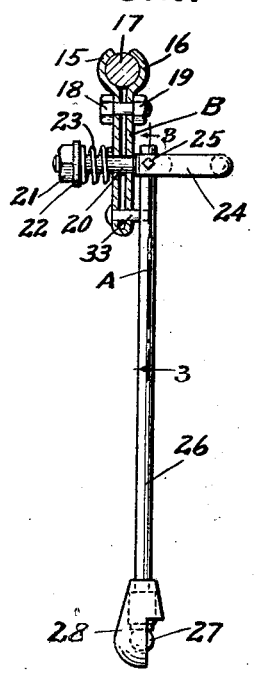
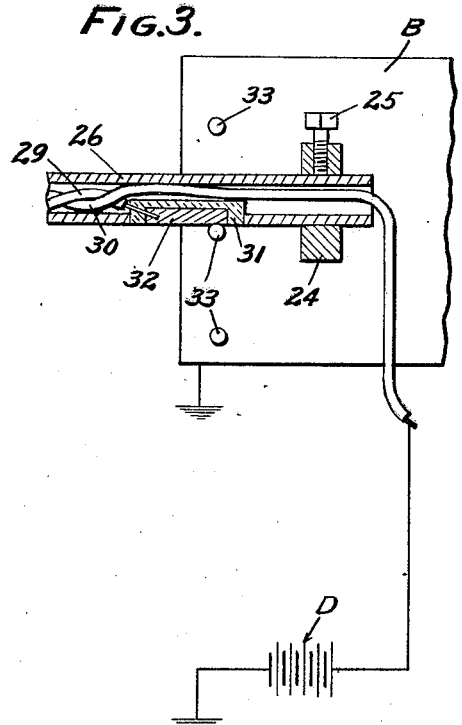
INVENTOR
SHERMAN F. CROY
BY Hazard & Miller
ATTORNEYS.

Patented Aug. 12, 1924.

1,504,815

UNITED STATES PATENT OFFICE.

SHERMAN F. CROY, OF LONG BEACH, CALIFORNIA.

TRAFFIC SIGNAL FOR MOTOR VEHICLES.

Application filed December 14, 1921. Serial No. 522,382.

*To all whom it may concern:*

Be it known that I, SHERMAN F. CROY, a citizen of the United States, residing at Long Beach, in the county of Los Angeles and State of California, have invented new and useful Improvements in Traffic Signals for Motor Vehicles, of which the following is a specification.

My invention relates to traffic signals for motor vehicles, and a purpose of my invention is the provision of a signal of this character of simple, durable and efficient construction and which is manually operable to clearly indicate the intentions of the operator of a motor vehicle.

I will describe two forms of signals embodying my invention and will then point out the novel features thereof in claims.

In the accompanying drawings,

Figure 1 is a perspective view showing a portion of the windshield having applied thereto one form of signal embodying my invention.

Fig. 2 is a top plan view, partly in section, of the signal shown in Fig. 1.

Fig. 3 is a longitudinal sectional view taken on the line 3—3 of Fig. 2.

Fig. 4 is a view showing another form of signal embodying my invention in applied position to the windshield of a closed car body.

Referring specifically to the drawings in which similar reference characters refer to similar parts, my invention in its first embodiment comprises a clamping bracket B made of a single length of metal bent at a point medially of its ends and upon itself to provide jaws 15 and 16, the free ends of which latter are convex to permit of the adaptation of the bracket to one of the vertical rods 17 of a windshield frame F. These jaws 15 and 16 are adapted to be secured in clamping position with respect to the rods 17 by means of bolts 18 extended through the bracket in the manner clearly shown in Figs. 1 and 2 and provided with nuts 19 for retaining the jaws in clamped position.

As clearly shown in Fig. 2, a pintle 20 extends transversely through the bracket B and is mounted therein for rotational movement, one end of the pintle being threaded to receive a nut 21 which embraces a washer 22 for confining an expansible spring 23 on the pintle and between the nut 21 and the bracket B. In the opposite end of the pintle 20, or that end disposed upon the opposite end of the bracket B from the nut 21 is formed a handle 24 provided with a suitable opening adapted to receive one end of an arm A which is secured therein by means of a set screw 25.

The arm A includes a rod 26 of suitable length so as to properly space the lamp 27 from the side of the vehicle to permit of its being readily observed from various points of the rear of the vehicle. The lamp 27 is fitted in a suitable socket formed on the free end of the rod 26, and this lamp is partially housed by a hood 28 which constitutes a reflector for directing the rays from the lamp rearwardly with respect to the signal.

As clearly shown in Fig. 3, the rod 26 is of tubular form to allow of the extending of conductors 29 and 30 therethrough for conveying current to the lamp 27. Adjacent the inner end of the rod 26 it is recessed to accommodate an insulating block 31, and in the block 31 is arranged a contact 32 which is connected to the conductor 29 as clearly shown. This contact 32 is adapted to engage any one of several stops 33 which, in the present instance, are in the form of pins secured in vertical alinement within the bracket B and extending from one side thereof. Current from a suitable source of supply, such as the battery D, is conveyed to the lamp 27 through the medium of the conductors 29 and 30, the conductor 29 being connected to one side of the battery, while the other side of such battery is grounded. The bracket B is also grounded so that the several stops 33 constitute one terminal of the circuit and the contact 32 the other terminal. Thus when the contact 32 engages in one of the stops 33, the circuit in the lamp 27 is closed to effect illumination of the latter.

In the operation of the signal, the spring 23 normally urges the pintle 20 to such a position that the rod 26 of the arm A reposes upon any one of the stops 33 so that in order to move the arm to any of its several indicating positions, it is necessary to grip the handle 24 and pull the pintle 20 rearwardly until the rod 26 disengages the stop 33, whereupon by rotation of the handle the arm can be moved to the desired indicating position. Before reaching such position, the handle is released thereby permitting the spring 23 to retract the pintle 20 and thus move the arm A to reposing position upon one of the stops 33. With the arm in this position, it will be clear that the stop and contact 32 operate to close the circuit and thus illuminate the lamp 27.

From this operation, it will be seen that with the arm A in one of its several indicating positions, the lamp 27 is illuminated thus clearly conveying to the traffic in the rear of the vehicle the intensions of the driver. When the signal is not in use, it will be understood that the arm A can be moved to perpendicular position so that the lamp 27 will not be illuminated.

Referring now to Fig. 4, I have here shown a modified form of signal which is of the same construction as the signal shown in the preceding views, with the exception that the bracket B is formed as to permit of its being secured by means of screws 34 or other suitable fastening members to the windshield frame of a sedan or other closed body.

Although I have herein shown and described only two forms of signals each embodying my invention, it is to be understood that various changes and modifications may be made herein without departing from the spirit of the invention and the spirit and scope of the appended claims.

I claim as my invention:

1. A traffic signal for motor vehicles comprising a bracket, an indicating arm rotatably sustained on the bracket, stops for sustaining the arm in any of several indicating positions, means for urging the arm to such a position that when moved it will engage said stops, a handle by means of which said arm can be manually positioned against the action of said urging means so that when moved it will engage said stops, a lamp carried by the arm, a contact on the arm, and a circuit including a source of current and conductors, one of which latter is connected to said lamp and to said contact and the other of which is connected to said source of current, the stops being adapted to be engaged by said contact to effect illumination of said lamp in any of its several indicating positions.

2. A signal comprising a bracket, a pintle rotatably mounted in the bracket, a handle formed on one end of the pintle, a nut on the other end of the pintle, an expansible spring surrounding the pintle at a point between said nut and bracket, an arm secured to the handle, stops mounted in the bracket and arranged to support said arm in any of several indicating positions, a lamp carried by the arm, a contact on the arm arranged to engage any of said stops, and a circuit including said lamp, contact and stops.

In testimony whereof I have signed my name to this specification.

SHERMAN F. CROY.